United States Patent
Wu

(10) Patent No.: US 8,842,099 B2
(45) Date of Patent: Sep. 23, 2014

(54) TOUCH PEN STRUCTURE

(71) Applicant: Songtak Technology Co., Ltd., Taoyuan (TW)

(72) Inventor: Mao-Sung Wu, Taoyuan (TW)

(73) Assignee: Songtak Technology Co., Ltd., Taoyuan County (TW)

( * ) Notice: Subject to any disclaimer, the term of this patent is extended or adjusted under 35 U.S.C. 154(b) by 0 days.

(21) Appl. No.: 13/678,707

(22) Filed: Nov. 16, 2012

(65) Prior Publication Data
US 2013/0076701 A1   Mar. 28, 2013

Related U.S. Application Data

(63) Continuation-in-part of application No. 12/000,656, filed on Dec. 14, 2007, now Pat. No. 8,355,008.

(51) Int. Cl.
*G06F 3/033*  (2013.01)
*G06F 3/0354* (2013.01)
*G06F 3/044*  (2006.01)

(52) U.S. Cl.
CPC ............ *G06F 3/033* (2013.01); *G06F 3/03545* (2013.01); *G06F 3/044* (2013.01)
USPC ............................. 345/179; 345/173; 345/174

(58) Field of Classification Search
None
See application file for complete search history.

(56) References Cited

U.S. PATENT DOCUMENTS

| | | | | |
|---|---|---|---|---|
| 3,749,503 | A * | 7/1973 | Duerr | 401/195 |
| 5,635,682 | A * | 6/1997 | Cherdak et al. | 178/19.01 |
| 5,914,708 | A * | 6/1999 | LaGrange et al. | 345/179 |
| 5,999,170 | A * | 12/1999 | Ooura et al. | 345/179 |
| 6,281,888 | B1 * | 8/2001 | Hoffman et al. | 345/179 |
| 2001/0028345 | A1 * | 10/2001 | Natsuyama et al. | 345/179 |
| 2004/0213622 | A1 * | 10/2004 | Kageyama et al. | 401/31 |
| 2005/0122319 | A1 * | 6/2005 | Sakurai et al. | 345/179 |
| 2006/0193677 | A1 * | 8/2006 | Fred | 401/195 |
| 2006/0239761 | A1 * | 10/2006 | Cetera | 401/258 |
| 2010/0294574 | A1 * | 11/2010 | Chen | 178/19.05 |
| 2011/0169775 | A1 * | 7/2011 | Liaw et al. | 345/175 |
| 2013/0038579 | A1 * | 2/2013 | Boyd et al. | 345/179 |

* cited by examiner

*Primary Examiner* — Jesus Hernandez
(74) *Attorney, Agent, or Firm* — Jackson IPG PLLC

(57) ABSTRACT

A touch pen includes a main body, a touch element and a conductive elastic element which is a conductor. The main body has a cladding portion at an end of the main body, and the touch element is disposed in the main body, and a contact portion is formed at an end of the touch element and exposed from the cladding portion. When use, the contact portion and a using surface form a larger touch area in contact with each other, or a side of the cladding portion and the contact portion form a smaller touch area in contact with the using surface, so that the larger touch area or the smaller touch area can be used to cope with the using habits of different users and achieve an effective touch function.

2 Claims, 18 Drawing Sheets

TOUCH PEN STRUCTURE

FIELD OF THE INVENTION

The present invention relates to an improved structure of a touch pen, in particular to the touch pen structure capable of providing an elastic buffer force to adjust the pressure of writing, so that a touch pen can support the function of clicking an increasingly smaller icon in an operation interface.

BACKGROUND OF THE INVENTION

At present, touch technology is used extensively in various electronic products. Broadly, working of touch devices may be categorized into two types of touch technologies. The two types of the touch technologies are capacitive touch recognition technology and pressure sensitive touch recognition technology (also known as resistive touch technology). In resistive touch panels, touch surfaces of the touch panels are pressed to drive upper and lower conductive films to be in contact with each other to detect touch event. On the other hand, capacitive touch panels are gently touched by a user's finger to produce a change of capacitance between the user's finger and the capacitive touch panel, which is recognized as a touch event.

Generally, the capacitive touch panels have a better sensitivity on the control or operation than that of the resistive touch panels. In addition, the capacitive touch panels have the advantages of dustproof, fire-resisting, scratch-resisting, high resolution, high transmittance, low reflection, high contrast, good durability, multi-point touch control and gesture operation over the resistive touch panels, and thus manufacturers attempt to adopt and develop related capacitive touch panel products.

With reference to FIG. 1 for a conventional capacitive touch panel 91, a user of the capacitive touch panel 91 controls a virtual keyboard 93 of the capacitive touch panel 91 by using a pulp of a finger 92. During the operation, the finger 92 blocks a portion of the user's vision, and the pulp of the finger 92 has a relatively large area which may touch other areas easily and by mistake and may cause unexpected operation frequently, particularly for users with have bigger fingers.

In addition, a nail 94 of the finger 92 is a non-conductor, so that the nail 94 cannot produce an appropriate capacitance with the capacitive touch panel 91 for controlling and operating the capacitive touch panel 91. Therefore, users with long nails have difficulties of operating the capacitive touch panel 91.

In addition, the finger may be contaminated easily, particularly in the hot weather, and thus giving rise to the issue of having sweat on the user's hands, and stains may remain on the capacitive touch panel 91 that is frequently touched by the finger 92. Therefore, it is difficult to keep the capacitive touch panel 91 clean all the time. Also, it is desirable to produce appropriate capacitance in the touch panel 91 to improve control and operation of the capacitive touch panels.

At present, the technology of using the finger 92 to operate and control the capacitive touch panel 91 have many problems that require breakthroughs and solutions.

Some prior arts try to address the aforementioned problems by providing a touch pen having means to prevent damage to a touch panel by absorbing total pressure applied on touch surface of the touch panel. These prior arts use a spring like mechanism for absorbing extra pressure applied on the touch surface by the tip of the touch pens. For example, Japanese Utility Model Application published as JP9282098 (A) on Oct. 31, 1997 discloses a technique in which a spring is integrally formed on an end-part of a touch pen's tip. Further, when the touch pen touches a touch panel, the touch pen's tip slides in the longitudinal direction of the touch pen into an opening, to absorb total pressure applied on the touch surface of the touch panel. Hence, this technique reduces the chances of causing damage to the touch panel. However, the touch pen disclosed in JP9282098 (A) does not facilitate the production of appropriate capacitance in the capacitive touch panels.

Further, U.S. patent application, published with Publication No. U.S.20010028345A1 (later, U.S. Pat. No. 6,710, 267), assigned to International Business Machines Corporation, discloses techniques that enable a touch pen to provide a smooth usage experience to its user on a touch panel, without causing any flaw in the touch panel. The touch pen disclosed in the U.S. patent application uses a touch ball made of resin like material at a pen tip of an input pen. The touch ball is held via two springs. Further, the touch ball is designed to be softer than a screen of a touch panel. This arrangement suppresses any deformation of the soft touch ball even if the input pen is strongly pressed against a screen of a touch panel. However, the touch pen disclosed in U.S.20010028345A1 does not facilitate the production of appropriate capacitance in the capacitive touch panels.

Furthermore, U.S. Pat. No. 6,361,232, assigned to Pilot Precision Kabushiki Kaisha, discloses techniques that enable a touch pen to avoid breaking a touch panel, in case if an excessively high force is exerted on the input tip of the touch pen. The input pen can be pressed against a touch panel of a portable information processing terminal device to enter desired data into the portable information processing terminal device. Thus, the input pen can be utilized to provide inputs to the touch panel and includes a mechanism that prevents damages to the touch sensitive surface of a device. However, there is no teaching provided by the patent for enabling a touch pen to produce appropriate capacitance in capacitive touch panels to improve control and operation of the capacitive touch panels.

Another existing technique as disclosed in U.S. patent application, published with Publication No. 20120026127, assigned to Samsung Mobile Display Co. Ltd., discloses techniques that enable a stylus pen for a capacitive touch panel to perform precise input while stably transmitting touch input. Further, the patent discloses a technique that enables the stylus pen to provide sufficient capacitance change that is enough to sense touch input by ensuring a contact area with a touch screen, by connecting a transparent electrode plate having a larger cross-sectional area than a center conductor at a tip portion of the center conductor. However, there in no teaching provided by this application for user's selection of a larger touch area or smaller touch area.

In light of the foregoing, there is a need for a touch device, such as touch pen, that can perform efficiently on touch sensitive screens, while maintaining a clean capacitive touch panel.

SUMMARY OF THE INVENTION

Therefore, it is a primary objective of the present invention to overcome the shortcomings of the prior art by providing an improved structure of a touch pen capable of providing an effective touch function on the capacitive panel with an inclination, by maintaining appropriate capacitance in capacitive touch panels to improve the control and operation of the capacitive touch panels.

To achieve the foregoing objective, the present invention provides a touch pen comprising a main body, a touch element and a conductive elastic element which is a conductor. The main body has a cladding portion disposed at an end of the main body, and the cladding portion has an opening and a containing space disposed in the main body and interconnected to the opening. The touch element is disposed in the containing space, and has a contact portion formed at an end of the touch element and exposed from the opening, and a limit portion formed at the other end of the touch element and snapped into the opening for the positioning purpose, and the conductive elastic element is disposed in the containing space, and an end of the conductive elastic element is abutted against the main body, and the other end of the conductive elastic element is abutted against the limit portion of the touch element for providing a buffer force of the downwardly pressed touch element and maintaining a uniform clicking force of the touch pen.

When being used, the contact portion and a using surface form a larger touch area in contact with one another, or a side of the cladding portion and the contact portion form a smaller touch area in contact with the using surface to cope with different using habits of the users, and a larger touch area or a smaller touch area can be used to achieve an effective touch function, but the touch pen structure of the invention also increases the wear resistance to extend the service life, and provides an elastic buffer force to adjust the pressure of writing, so that the touch pen can achieve the effects of supporting the function of clicking an increasingly smaller icon in an operation interface and reducing damages caused by applying improper forces onto the touch screen.

DESCRIPTION OF THE PREFERRED EMBODIMENTS

The technical characteristics of the present invention will become apparent with the detailed description of the preferred embodiments accompanied with the illustration of related drawings as follows.

Figure 1:
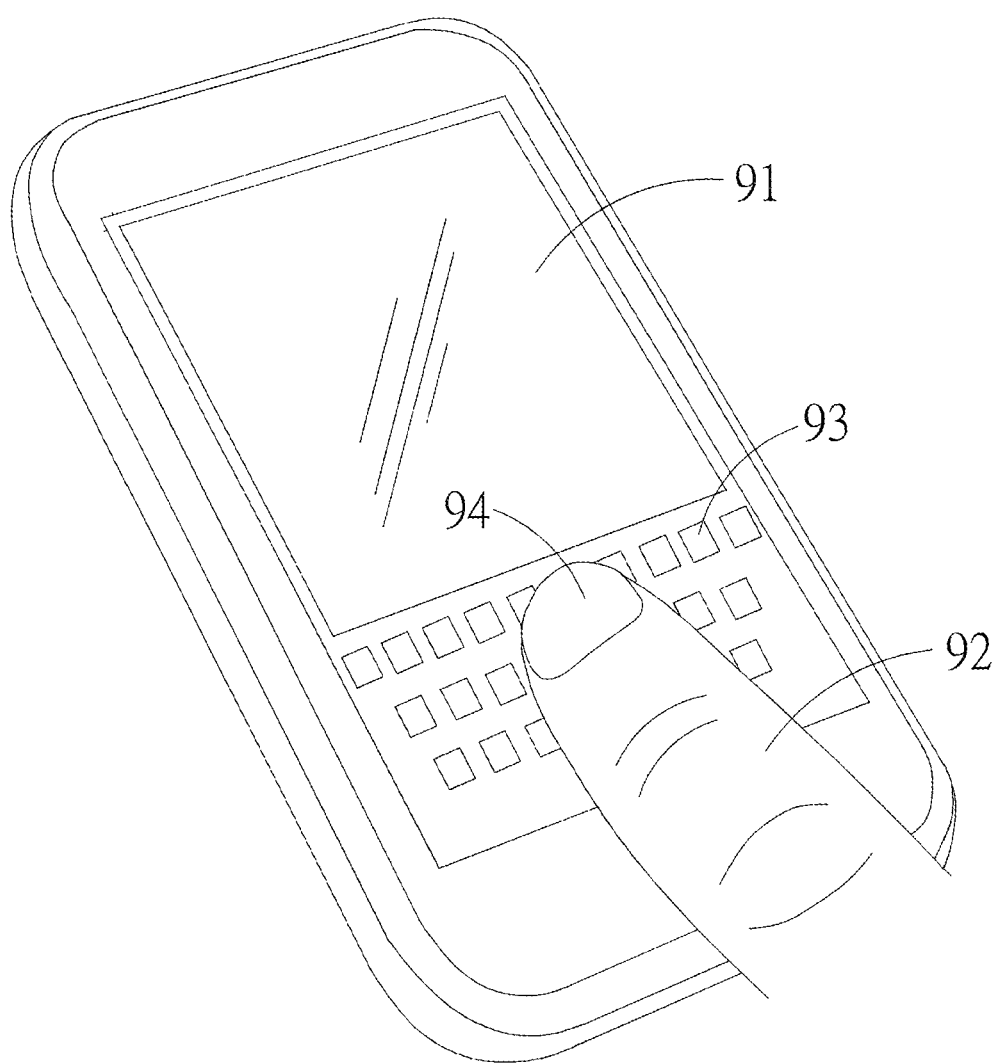
FIG. 1 is a schematic view of a conventional touch panel.
Figure 2:
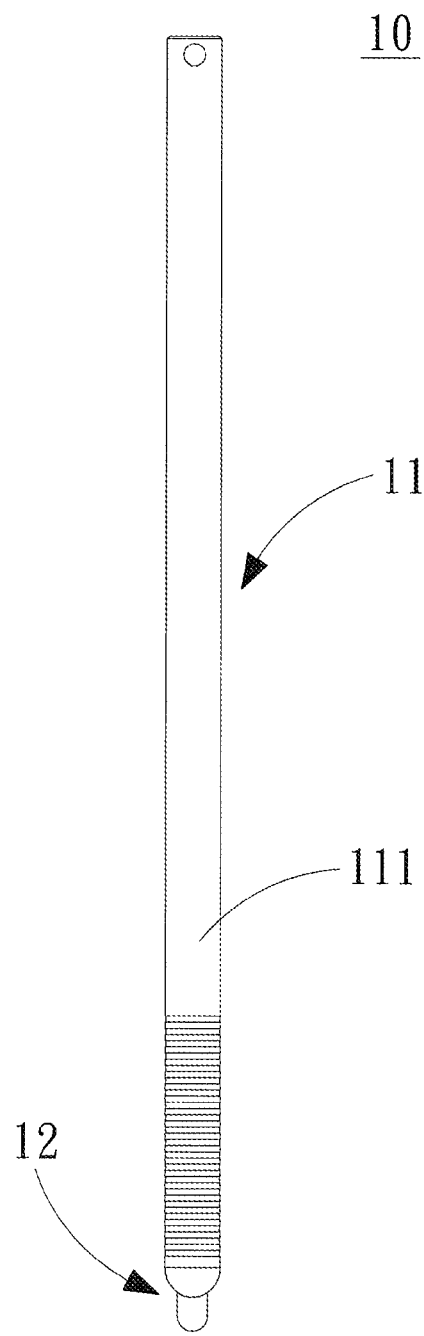
FIG. 2 is a perspective view of a touch pen in accordance with a first preferred embodiment of the present invention.
Figure 3:
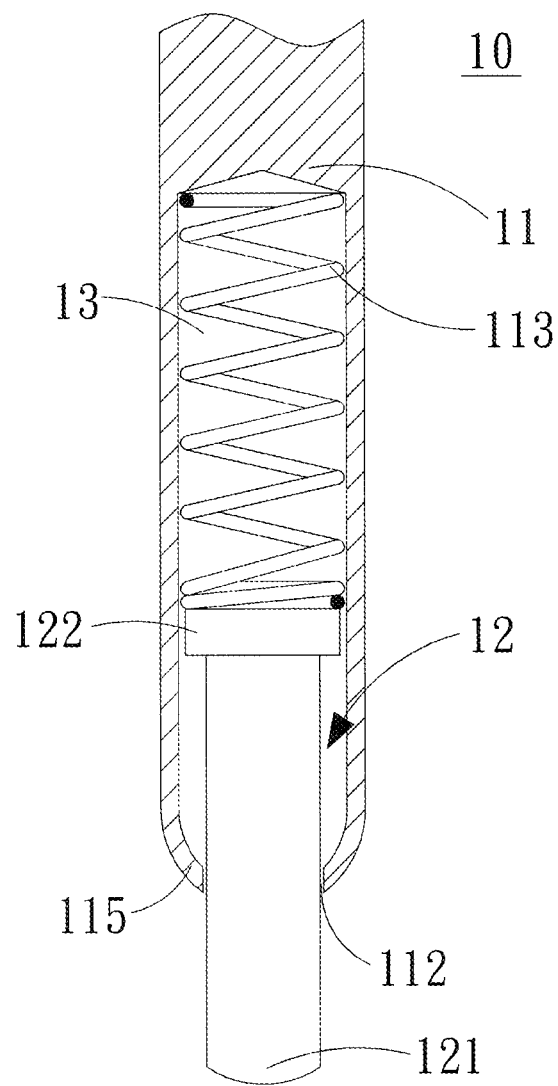
FIG. 3 is a schematic view of a touch pen in accordance with the first preferred embodiment of the present invention.

With reference to FIGS. 2 and 3 for a touch pen 10 of the present invention, the touch pen 10 comprises a main body 11, a touch element 12 and a conductive elastic element 113.

The main body 11 is a conductor and has a hand-holding portion 111 provided for holding the main body 11, a cladding portion 114 disposed at an end of the main body 11, an opening 112 formed on the cladding portion 114, and a containing space 13 formed in the main body 11 and interconnected to the opening 112.

The touch element 12 is a rigid conductor, and the touch element 12 is disposed in the containing space 13, wherein a contact portion 121 is disposed at an end of the touch element 12, and a limit portion 122 is disposed at the other end of the touch element 12, and the touch element 12 is made of metal, conductive plastic, conductive rubber or conductive foam or can be a rigid structure covered with a conductive fabric.

The conductive elastic element 113 is disposed in the containing space 13 and has an end abutted against the main body 11 and the other end abutted against the limit portion 122 of the touch element 12. Thus, the touch element 12 is movable with respect to the cladding portion 114.

Figure 4A:
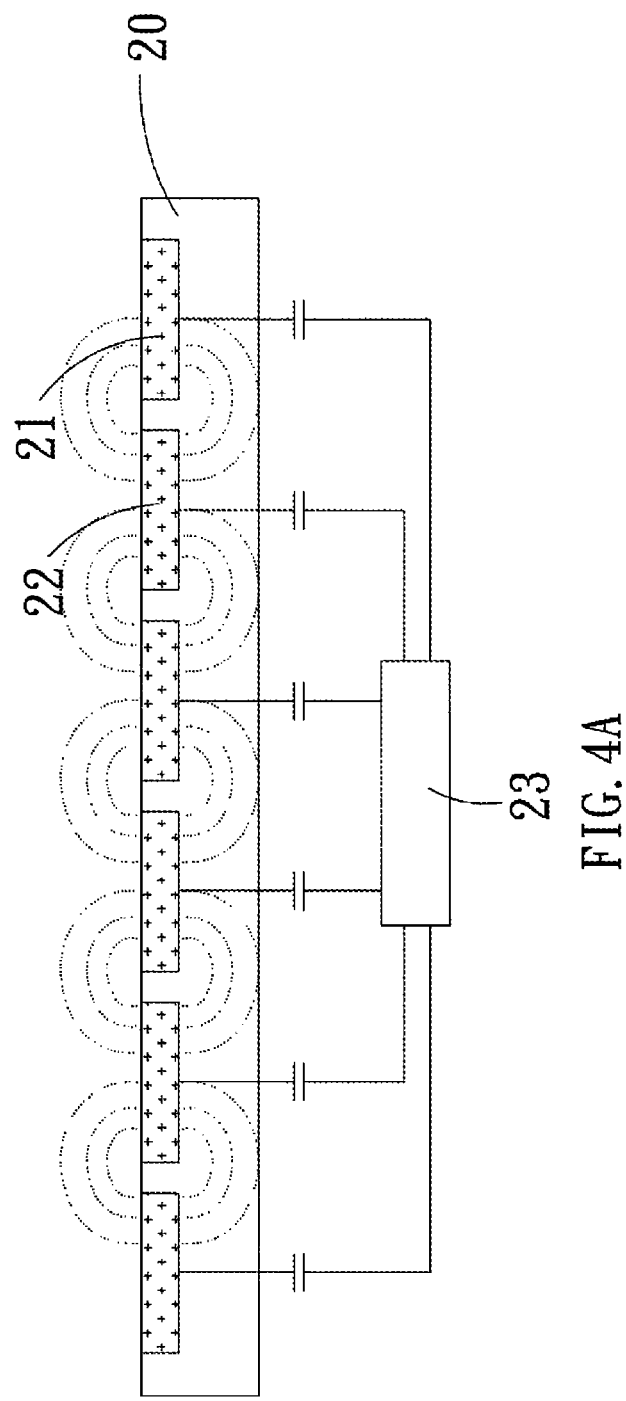
FIG. 4(A) is a schematic view of a conventional capacitive panel.

In a preferred embodiment as shown in the figures, the limit portion 122 has an external diameter slightly greater than the size of the opening 112, so that the limit portion 122 can be snapped into the opening 112 for the positioning purpose, and the touch element 12 will not fall out from the main body 11. With reference to FIG. 4(A) for a schematic view of a general capacitive touch panel 91, the capacitive panel 20 has a plurality of first electrodes 21 disposed on the X-axis and a plurality of second electrodes 22 disposed on the Y-axis and on two different conductive substrates (or both front and back sides of the same conductive substrate) respectively, and a controller 23 electrically coupled to each of the first and second electrodes 21, 22. At a power-on condition, each of the first electrode and the second electrode 21, 22 has a fixed capacitance value, and each capacitance coupling forms a driving line.

Figure 4B:
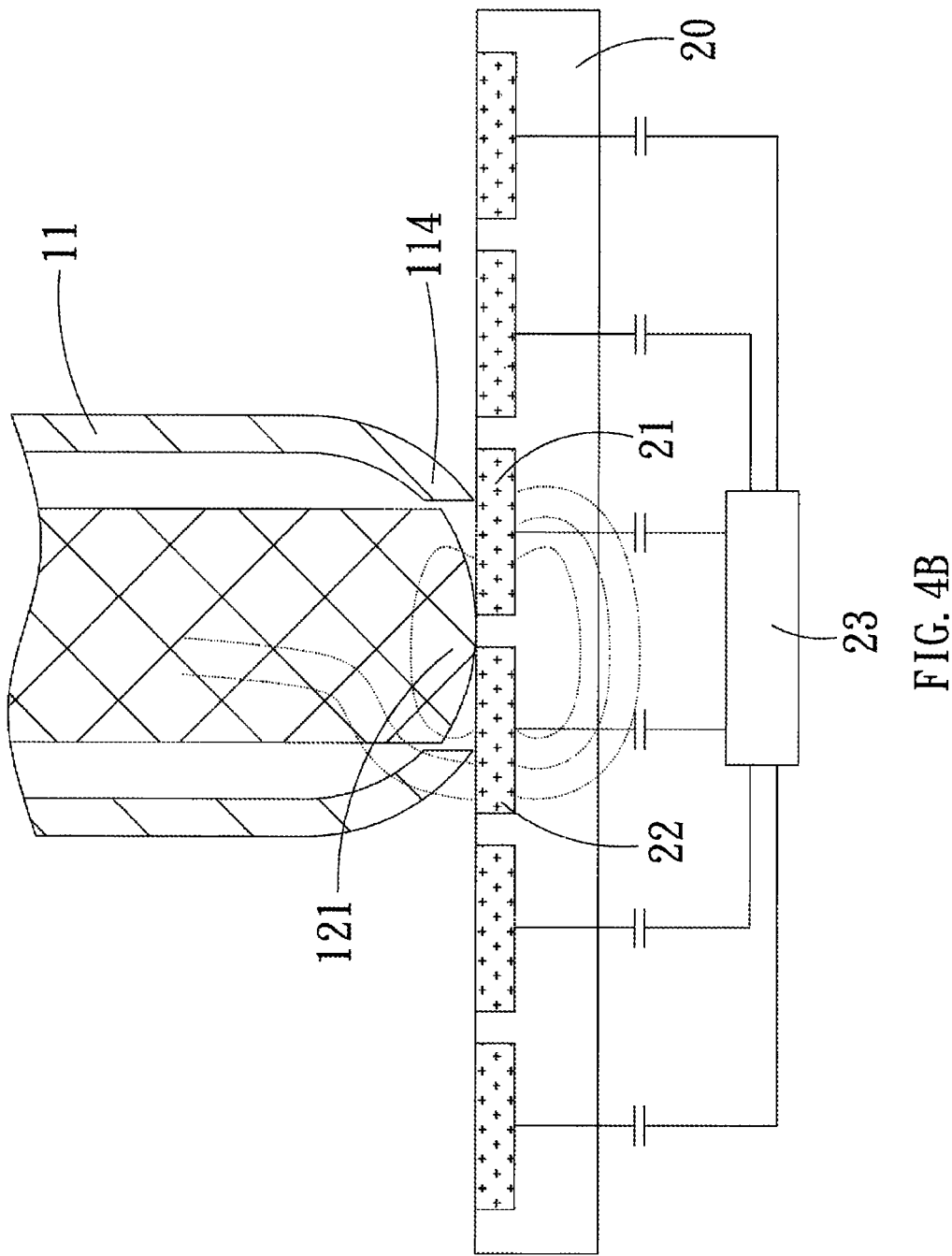
FIG. 4(B) is a schematic view of an application of a touch pen in accordance with the first preferred embodiment of the present invention.

When a user holds the hand-holding portion of the touch pen by a hand to control the capacitive panel 20, the user's body is in contact with the main body 11 through the hand, and the touch element 12 at an end approaches or touches the capacitive panel 20 as shown in FIG. 4(B), wherein the user touches the main body 11 in a direction substantially perpendicular to the capacitive panel 20. Now, the cladding portion 114 and the contact portion 121 form a larger touch area, and the touch area is disposed across adjacent first and second electrodes 21, 22 to form a coupling capacitance and takes away a portion of current, so as to change the capacitance value of each electrode. The controller 23 detects the change value of the capacitance to determine the contact position of the capacitive panel in order to achieve the touch operating effect.

Figure 5:
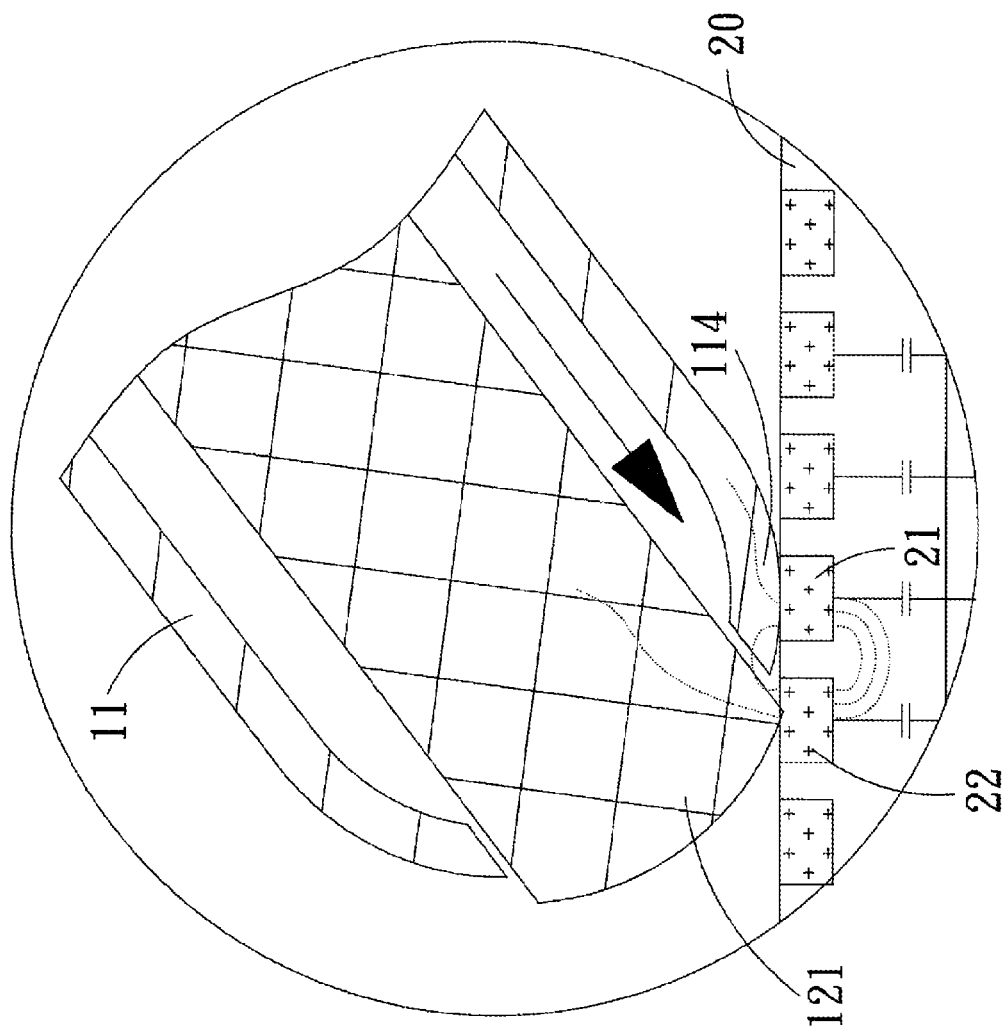
FIG. 5 is a schematic view of another application of a touch pen in accordance with the first preferred embodiment of the present invention.
Figure 6:
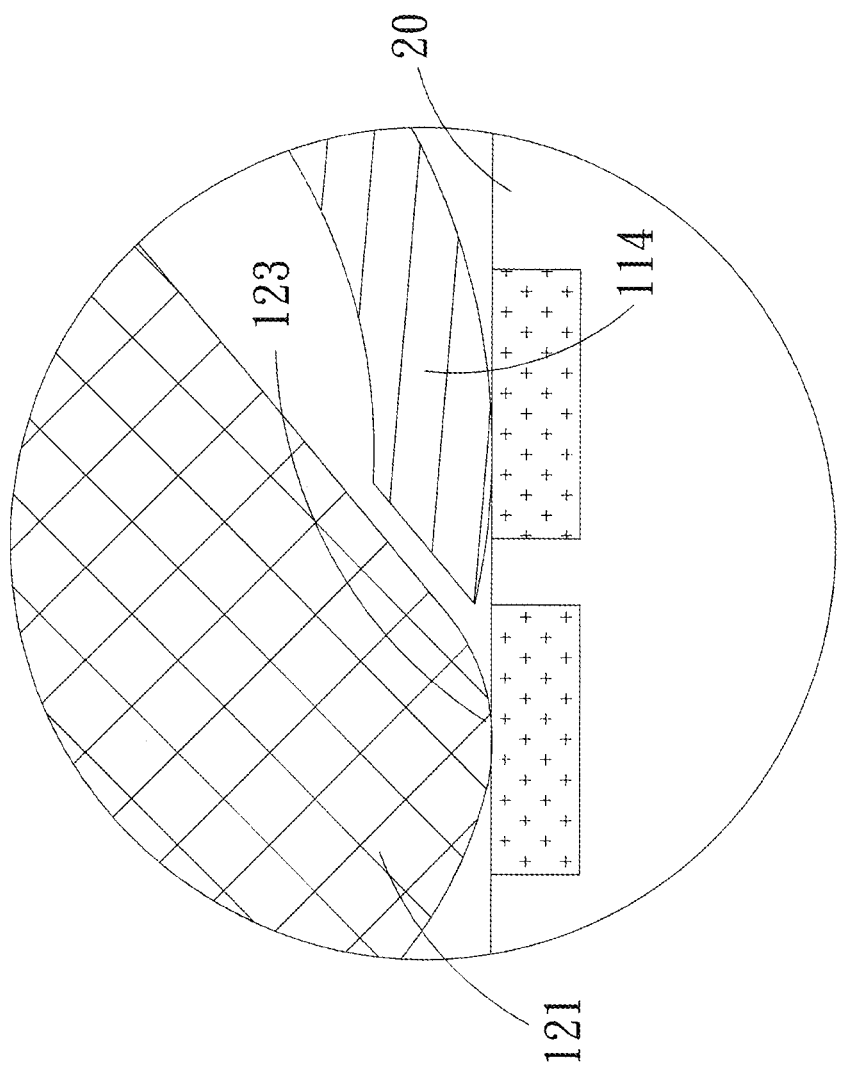
FIG. 6 is a schematic view of an application of a touch pen in accordance with a second preferred embodiment of the present invention.

When a user changes the mode of using the touch pen of the present invention as shown in FIG. 5 and the touch pen is used in an electrode icon with a smaller area, the user touches the main body 11 with a capacitive panel 20 at an inclination. Now, the contact portion 121 is pushed by the conductive elastic element and exposed from the opening 112, so that the contact portion 121 and a side of the cladding portion 114 form a smaller touch area, and the touch area is disposed across adjacent first and second electrodes 21, 22 to similarly achieve the touch operating effect. Of course, the arc convex surface formed by the cladding portion 114 can protect the capacitive panel 20 from being scratched. In a second preferred embodiment as shown in FIG. 6, an arc guide corner 123 is formed on the contact portion 121 for protecting the capacitive panel 20 from being scratched.

Figure 7A:
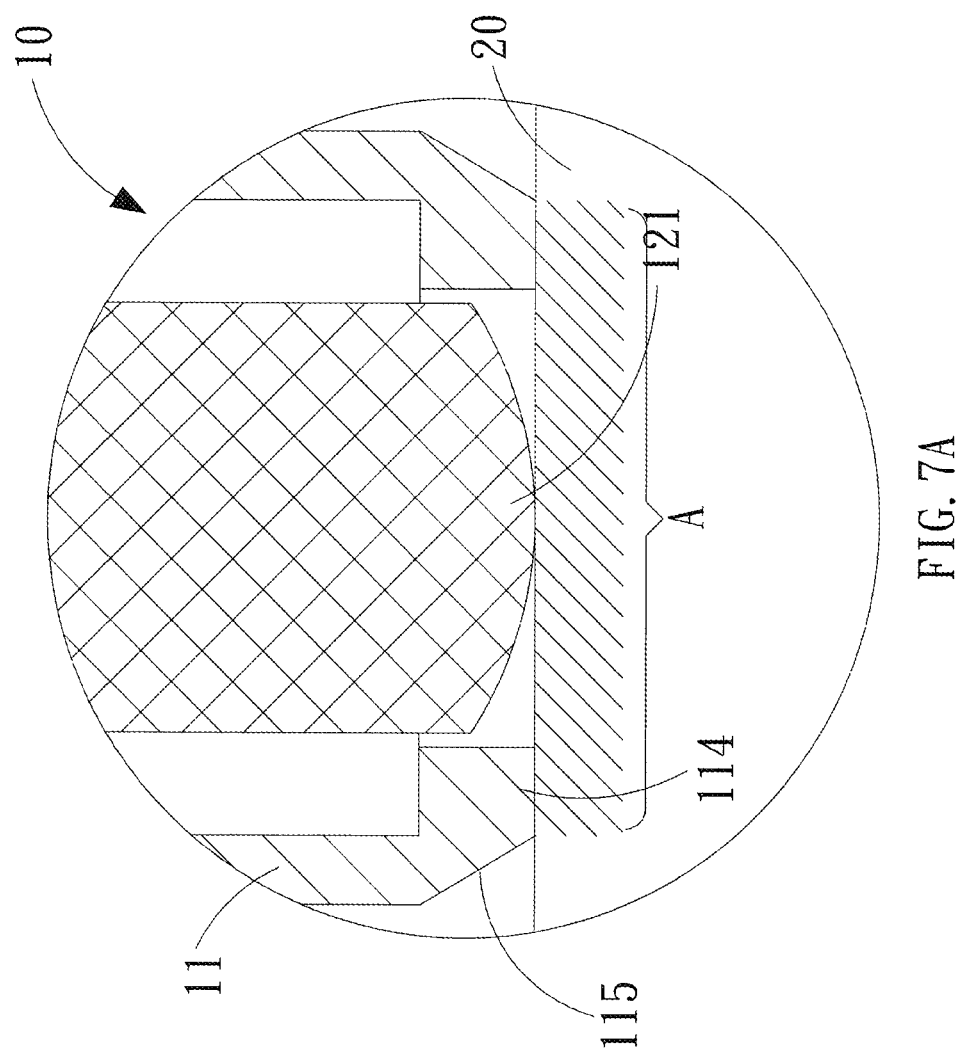
FIGS. 7(A) and 7(B) are schematic views of a touch pen in accordance with a third preferred embodiment of the present invention.
Figure 7B:
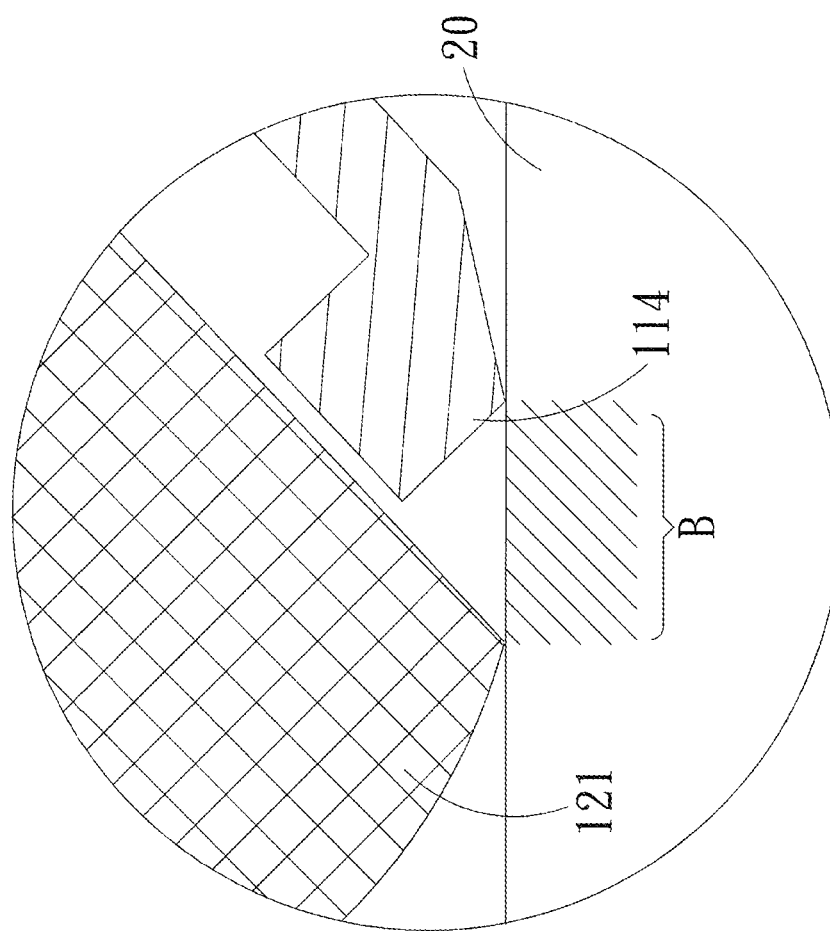

With reference to FIG. 7(A) for the third preferred embodiment of the present invention, the cladding portion 114 can be a plane surface, and a chamfer surface 115 is formed between the cladding portion 114 and the main body, and an arc convex surface is formed at an end of the contact portion 121. During use, the touch pen 10 is similarly and substantially perpendicular to the capacitive panel 20, and the cladding portion 114 and the contact portion 121 form a larger touch area A in contact with the capacitive panel 20. With reference to FIG. 7(B), the touch pen 10 touches the capacitive panel 20 with an inclination. Similarly, the contact portion 121 and a side of the cladding portion 114 form a smaller touch area B in contact with the capacitive panel 20.

Figure 8A:
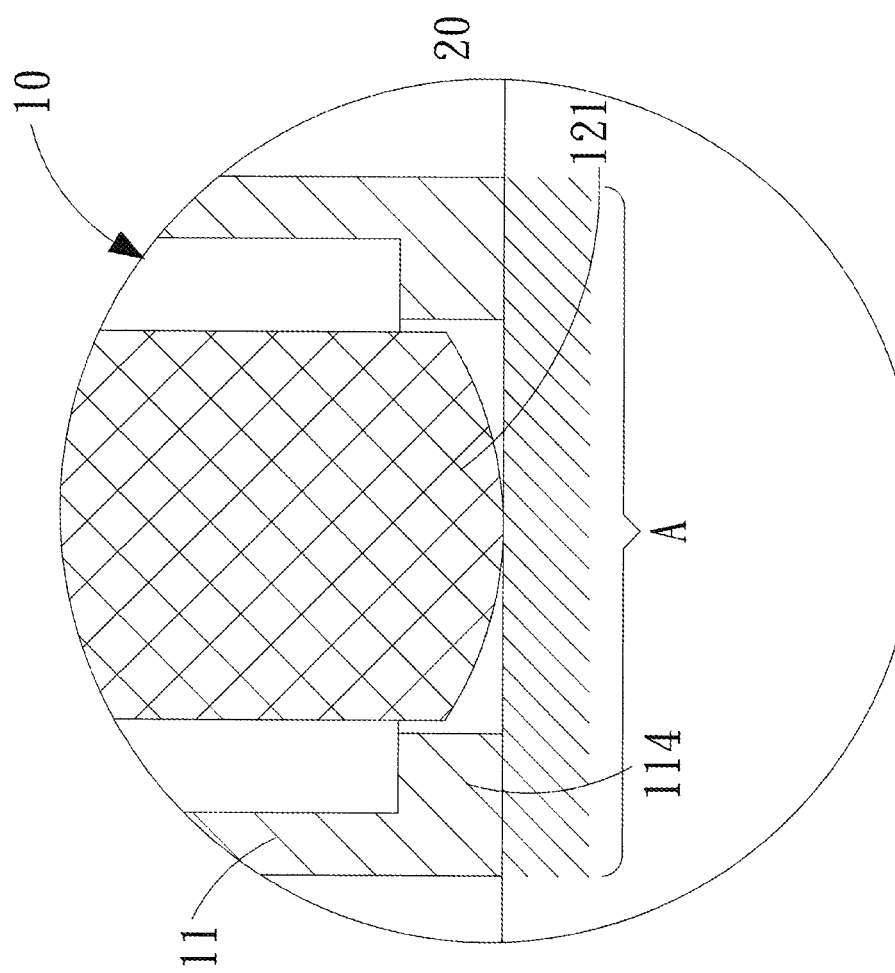
FIGS. 8(A) and 8(B) are schematic views of a touch pen in accordance with a fourth preferred embodiment of the present invention.
Figure 8B:
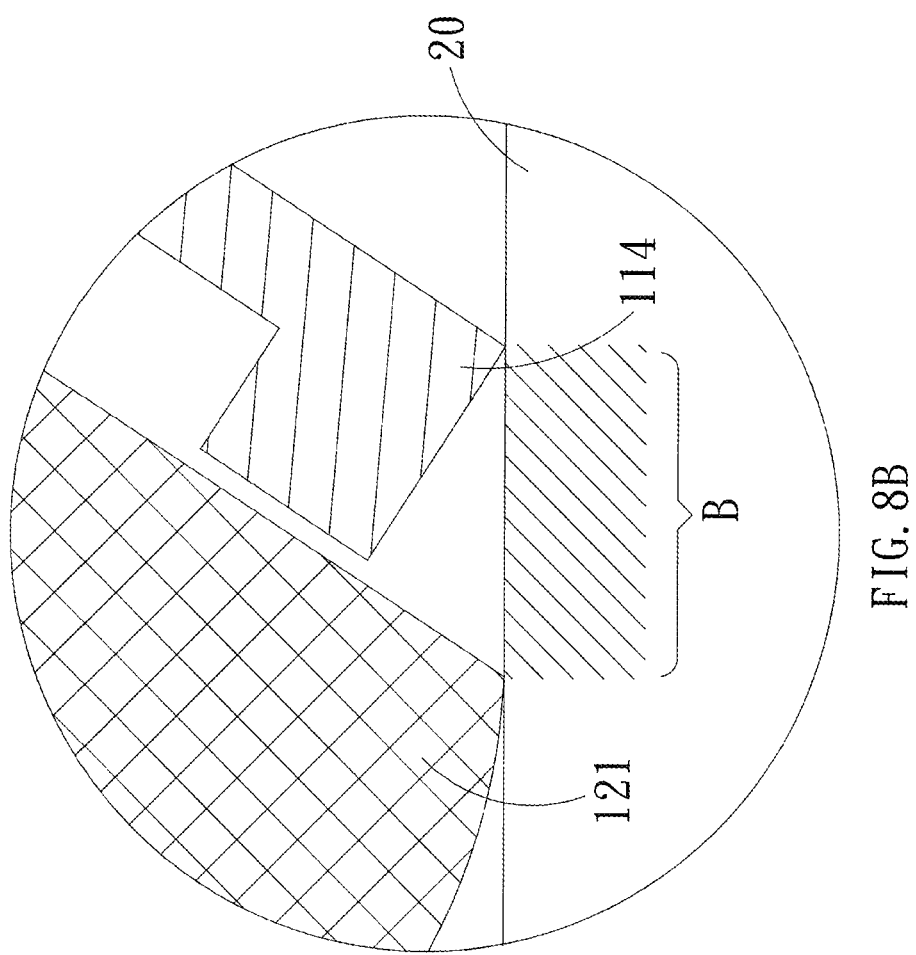
Figure 9A:
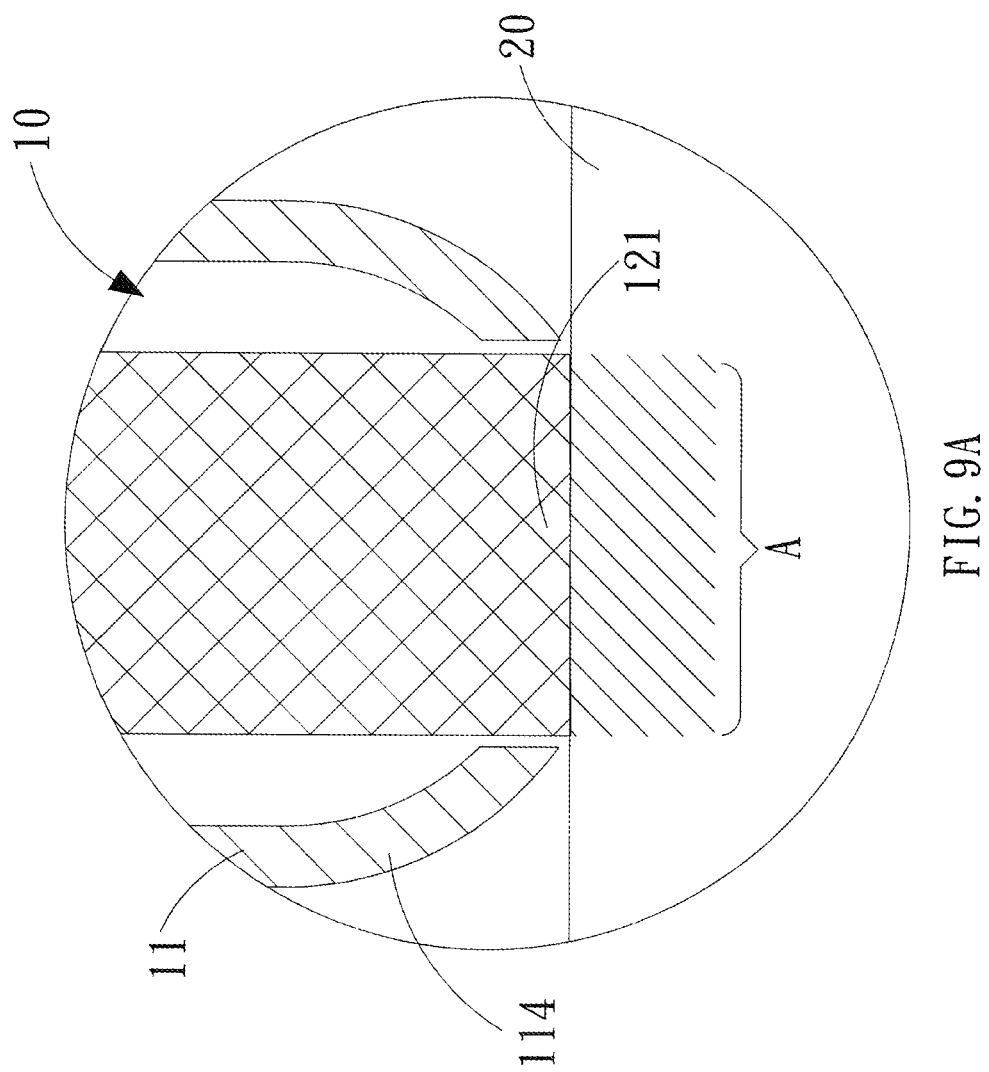
FIGS. 9(A) and 9(B) are schematic views of a touch pen in accordance with a fifth preferred embodiment of the present invention.
Figure 9B:
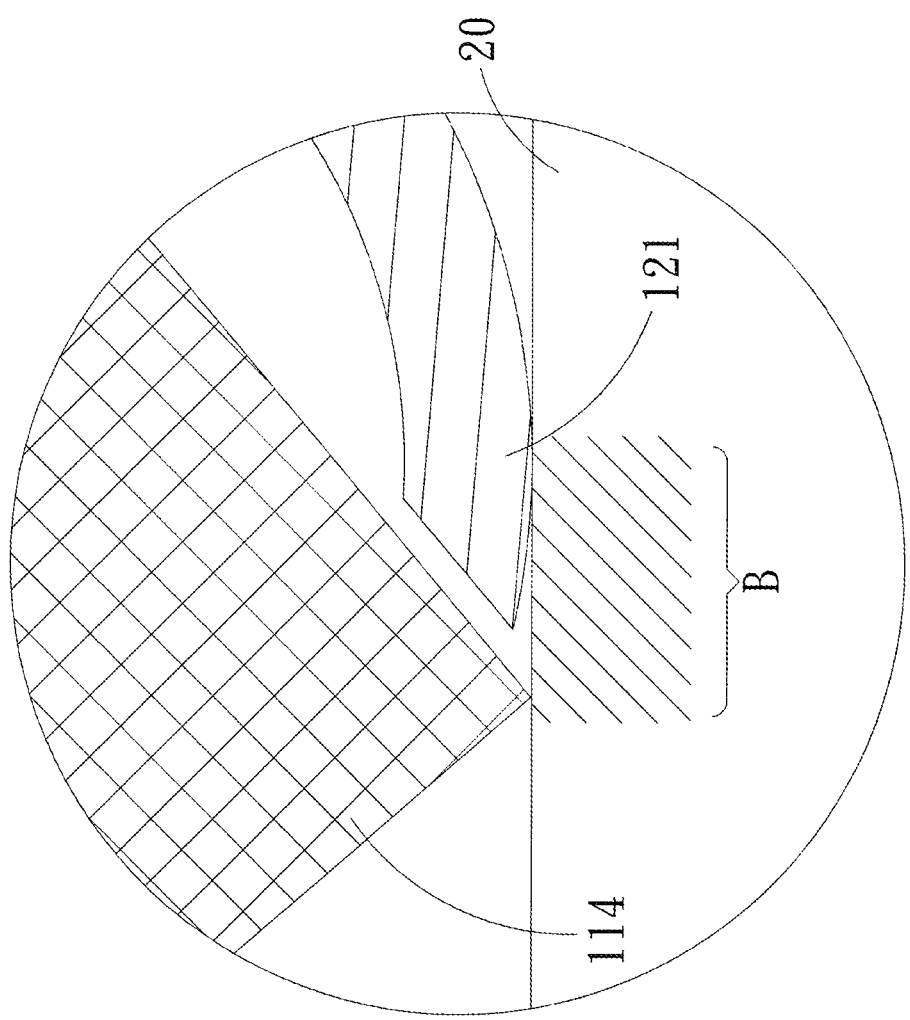
Figure 10A:
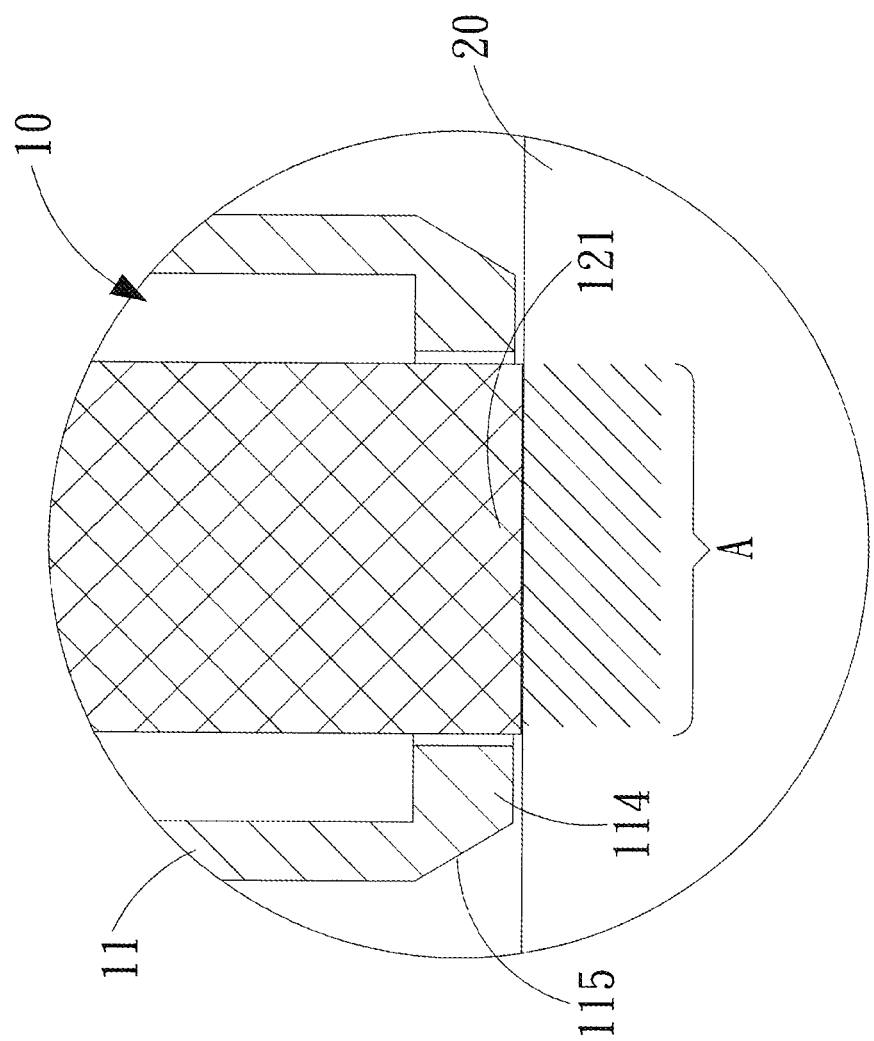
FIGS. 10(A) and 10(B) are schematic views of a touch pen in accordance with a sixth preferred embodiment of the present invention.
Figure 10B:
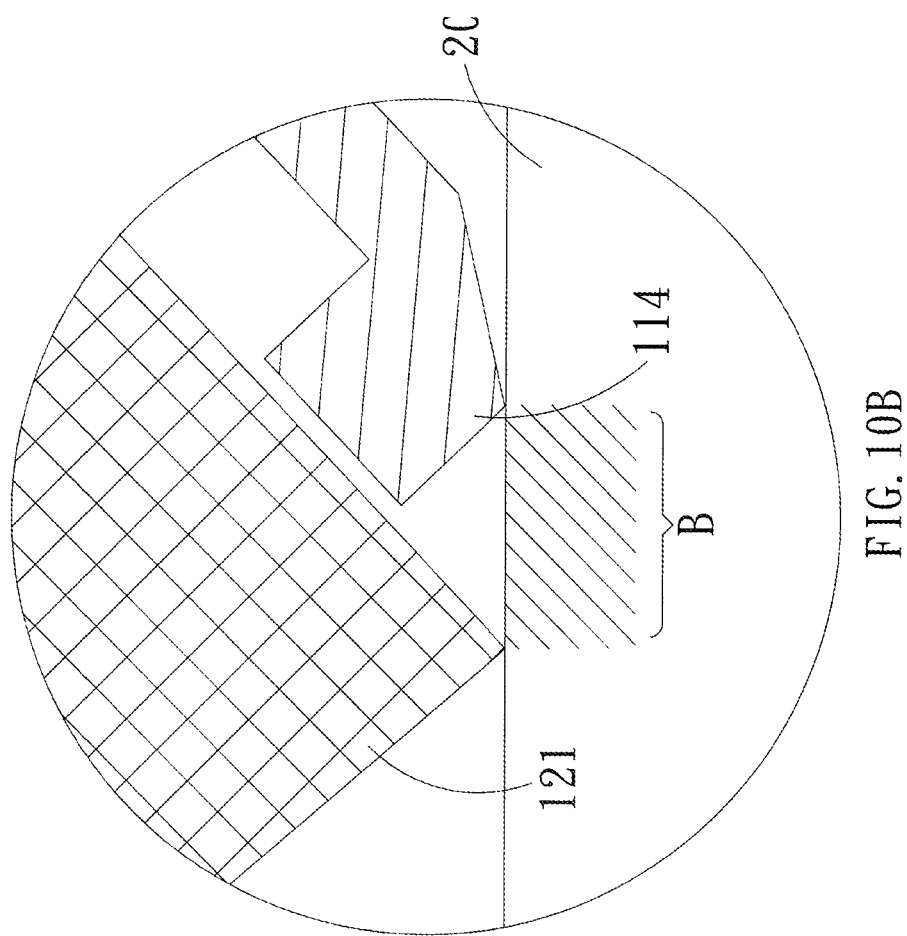
Figure 11A:
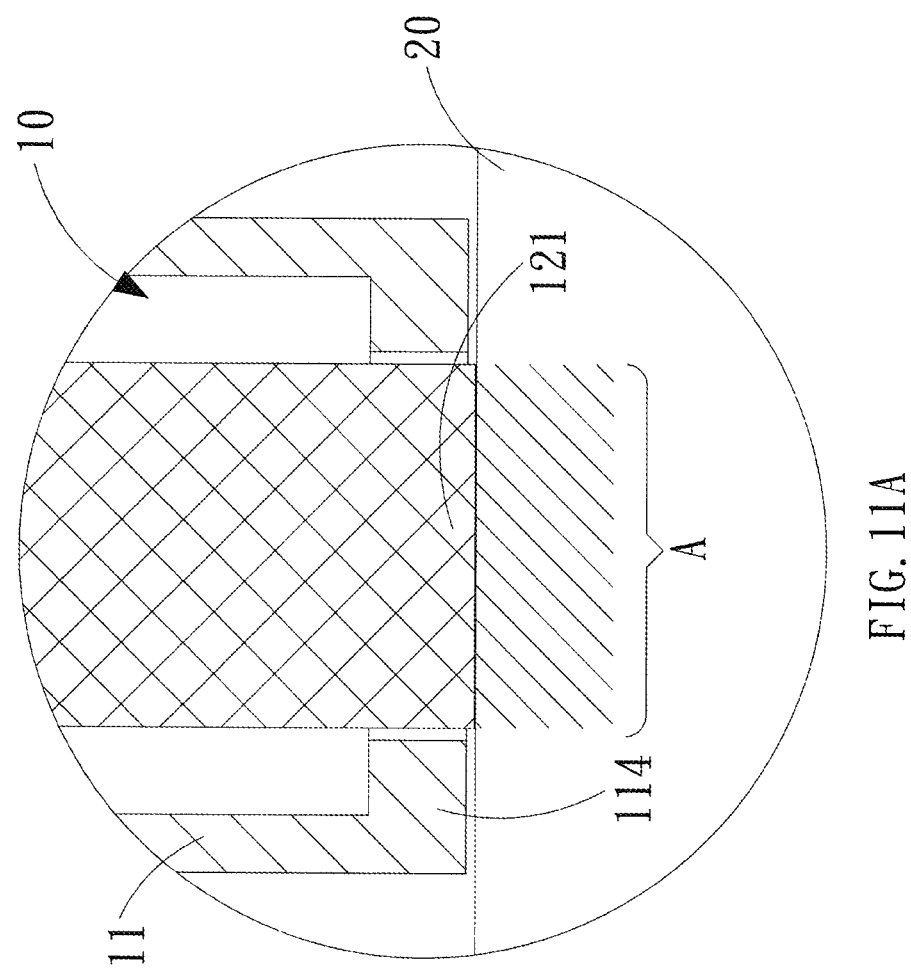
FIGS. 11(A) and 11(B) are schematic views of a touch pen in accordance with a seventh preferred embodiment of the present invention.
Figure 11B:
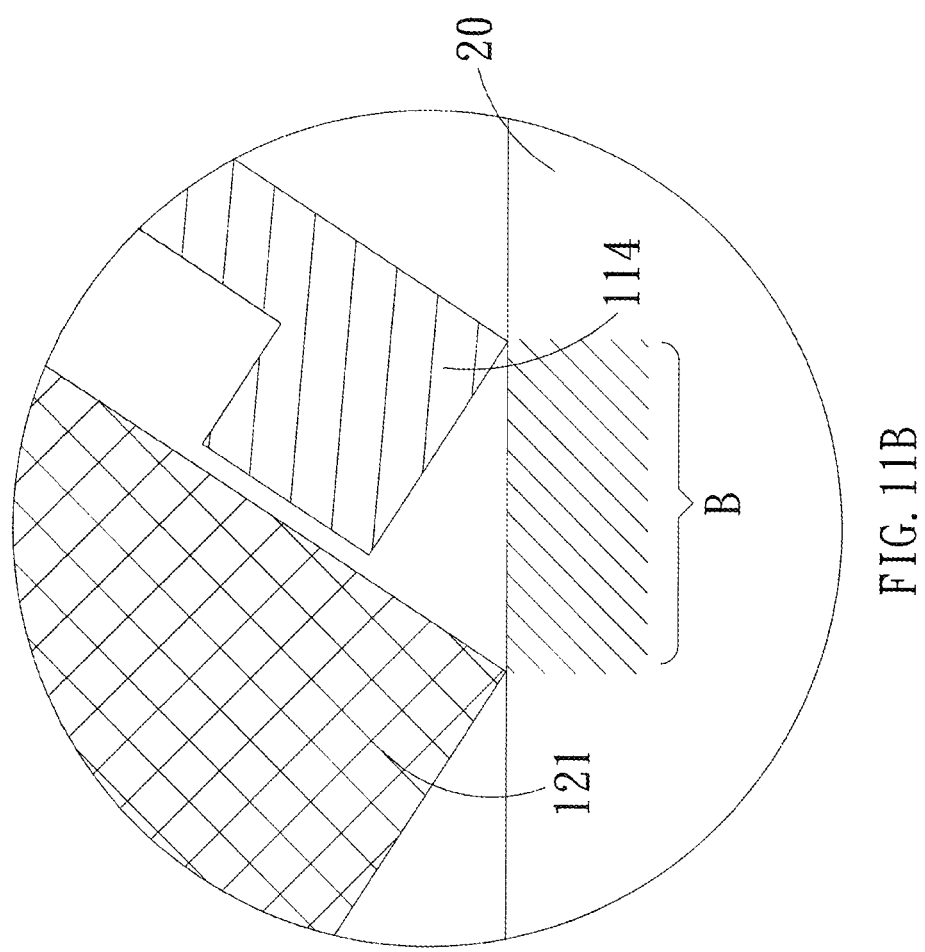

With reference to FIGS. 8(A) and 8(b) for the fourth preferred embodiment of the present invention, the cladding portion 114 is a plane surface extended perpendicularly from the main body 11 towards the contact portion 121, and an arc convex surface is formed at an end of the contact portion 121. With reference to FIG. 9(A) and 9(B) for the fifth preferred embodiment of the present invention, the cladding portion 114 is an arc convex surface, and a plane surface is formed at an end of the contact portion 121. With reference to FIGS. 10(A) and 10(b) for the sixth preferred embodiment of the present invention, the cladding portion 114 is a plane surface, and a chamfer surface 115 is formed between the cladding portion 114 and the main body 11, and a plane surface is formed at an end of the contact portion 121. With reference to FIGS. 11(A) and 11(b) for the seventh preferred embodiment of the present invention, the cladding portion 114 is a plane surface extended perpendicularly from the main body 11 towards the contact portion 121, and a plane surface is formed at an end of the contact portion 121.

In each of the foregoing preferred embodiments, the cladding portion 114 and the contact portion 121 form a larger touch area A in contact with the capacitive panel 20 regardless of the user's touch pen 10 being substantially perpendicular to the capacitive panel 20 or touched with the capacitive panel 20 with an inclination, the contact portion 121 and a side of the cladding portion 114 can form a smaller touch area B in contact with the capacitive panel 20, so as to cope with different using habits of the users. The larger touch area or the smaller touch area can be used to achieve the effective touch function, wherein the larger touch area can be applied to an electrode icon with a larger area or a capacitive panel with a larger interval; and the smaller touch area can be applied to an electrode icon with a smaller area, or a capacitive panel with a smaller interval, so that the touch panel can be applied to a small screen bundled with high-precision hand-drawing and writing functions.

In addition, the main body and/or a pen head can have a transparent appearance, and the main body and/or the pen head are made of acrylic, crystal, glass, transparent plastic, PC, PS, flexible PVC, or ABS, and a transparent conductive film (such as a conductive polymer material) can be coated onto an external surface of the main body and/or the pen head.

Figure 12:
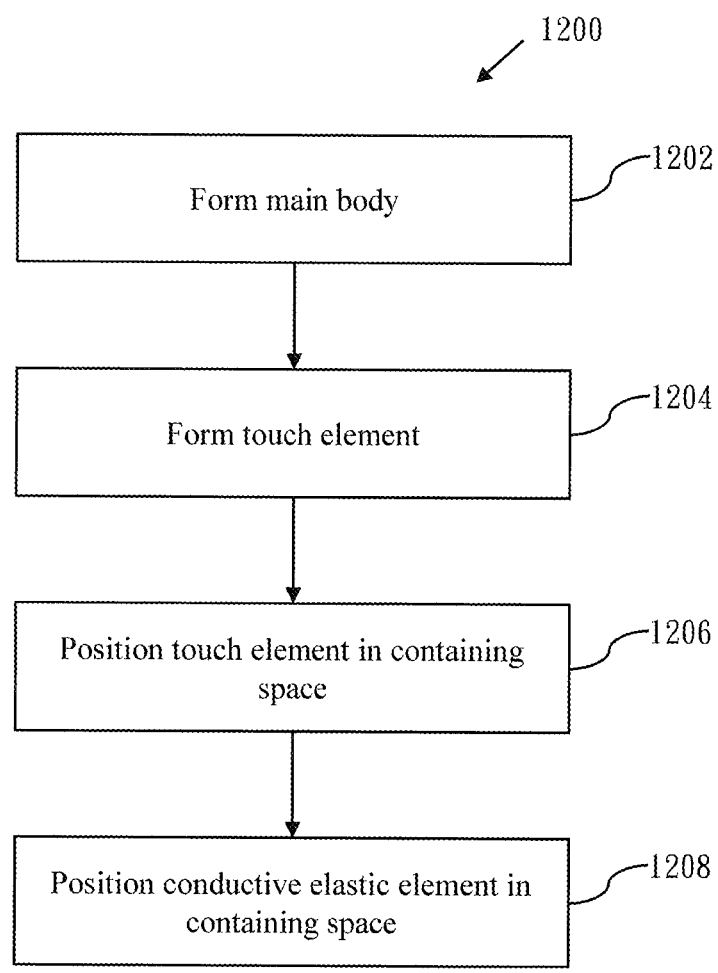
FIG. 12 is a flow diagram illustrating a method for assembling a touch pen in accordance with an embodiment.

FIG. 12 is a flow diagram 1200 illustrating a method for assembling the touch pen 10 in accordance with an embodiment.

At step 1202, the main body 11 is formed using a conductive material. The main body 11 includes the hand-holding portion 111, the cladding portion 114, disposed at an end of the main body 11, the opening 112 formed on the cladding portion 114, and the containing space 13 disposed in the main body 11 and interconnected to the opening 112.

In an embodiment, the main body 11 is formed using a molding technique.

The conductive material is molded in to a predefined mold. In an embodiment, the mold has the shape such that the main body 11 as depicted FIG. 2 can be formed. The present invention is not limited with respect to the method of molding. Any suitable molding technique may also be used without deviating from the scope of the present invention.

At step 1204, the touch element 12 is produced using a material selected from the collection of metal, conductive plastic, conductive rubber and conductive foam. In an embodiment, various techniques can be used for manufacturing the touch element 12. The touch element 12 comprises the contact portion 121 formed at an end of the touch element 12 and exposed from the opening 112, and the limit portion 122 formed at the other end of the touch element 12.

At step 1206, the touch element 12 is positioned in the containing space 13. In an embodiment, the touch element 12 is inserted from an upper end of the main body 11 such that the limit portion 122 remains inside the containing space 13.

At step 1208, the conductive elastic element 113 is positioned in the containing space 13 such that the touch element 12 is movable with respect to the cladding portion 114. One end of the conductive elastic element 113 is coupled to the main body 11 and another end of the conductive elastic element 113 is coupled to the limit portion 122 of the touch element. In an embodiment, the coupling can be provided using various adhesives. In another embodiment, the coupling can be made using various mechanical coupling arrangements, including but not limited to, fastening, screwing, hooking, fixing, tightening, and the like.

What is claimed is:

1. A touch pen structure, comprising:
    a conductive main body having a hand-holding portion provided for holding the main body with an electrically conductive cladding portion disposed at an end of the main body, an opening formed on the cladding portion, and a containing space disposed in the main body and interconnected to the opening;
    a touch element, being a rigid conductor, disposed in the containing space, and having a contact portion formed at an end of the touch element and exposed from the opening, and a limit portion formed at the other end of the touch element and snapped into the opening for positioning; and
    a conductive elastic element, disposed in the containing space, and having an end abutting the main body, and the other end abutting the limit portion of the touch element, wherein the conductive elastic element enables movement of the touch element with respect to the cladding portion; such that, when being used, the electrically conductive cladding portion and the contact portion cooperatively define a touch area in contact with a touch control surface so as to induce a capacitance change on the touch control surface; and
    wherein the electrically conductive cladding portion and the contact portion are configured to span a distance substantially equal to the distance between two adjacent electrodes disposed on the touch control surface, such that when the electrically conductive cladding portion and the contact portion are both in contact with the touch control surface, the electrically conductive cladding portion will be in contact with one of the two adjacent electrodes if the contact portion is in contact with the other of the two adjacent electrodes.

2. The touch pen structure of claim 1, wherein the two adjacent electrodes respectively comprise two different sensing electrode sets arranged in orthogonal directions.

* * * * *